(12) United States Patent
Lehmann Madsen

(10) Patent No.: US 11,577,478 B2
(45) Date of Patent: Feb. 14, 2023

(54) METHOD OF MOLDING A SHELL PART OF A WIND TURBINE BLADE

(71) Applicant: LM WP PATENT HOLDING A/S, Kolding (DK)

(72) Inventor: Kristian Lehmann Madsen, Fredericia (DK)

(73) Assignee: LM WP PATENT HOLDING A/S, Kolding (DK)

(*) Notice: Subject to any disclaimer, the term of this patent is extended or adjusted under 35 U.S.C. 154(b) by 626 days.

(21) Appl. No.: 16/081,190

(22) PCT Filed: Mar. 2, 2016

(86) PCT No.: PCT/EP2016/054426
§ 371 (c)(1),
(2) Date: Aug. 30, 2018

(87) PCT Pub. No.: WO2017/148514
PCT Pub. Date: Sep. 8, 2017

(65) Prior Publication Data
US 2019/0070801 A1    Mar. 7, 2019

(51) Int. Cl.
*B29C 70/48* (2006.01)
*B29B 11/16* (2006.01)
(Continued)

(52) U.S. Cl.
CPC .............. *B29C 70/48* (2013.01); *B29B 11/04* (2013.01); *B29B 11/16* (2013.01); *B29C 70/085* (2013.01);
(Continued)

(58) Field of Classification Search
CPC ..... B29C 70/48; B29C 70/443; B29C 70/085; B29D 99/0028; B29B 11/04; B29B 11/16;
(Continued)

(56) References Cited

U.S. PATENT DOCUMENTS

| 5,080,851 A | * | 1/1992 | Flonc ...................... B29B 11/16 |
| | | | 156/222 |
| 2005/0106029 A1 | * | 5/2005 | Kildegaard ............. B29C 70/86 |
| | | | 416/229 R |

(Continued)

FOREIGN PATENT DOCUMENTS

| DE | 102011078951 C5 | 9/2017 |
| EP | 2338668 A1 * | 6/2011 ........... F03D 1/0675 |

(Continued)

OTHER PUBLICATIONS

Halász, István Zoltán, and Tamás Bárány. "Phase Morphology and Mechanical Properties of Cyclic Butylene Terephthalate Oligomer-Containing Rubbers: Effect of Mixing Temperature." Materials (Basel, Switzerland) vol. 9,9 722. Aug. 24, 2016, doi: 10.3390/ma9090722 (Year: 2016).*

(Continued)

*Primary Examiner* — Jacob T Minskey
*Assistant Examiner* — Caroline Beha
(74) *Attorney, Agent, or Firm* — Nath, Goldberg & Meyer; Jerald L. Meyer; Tanya E. Harkins

(57) ABSTRACT

The present invention relates to a method of molding a shell part of a wind turbine blade comprising the steps of providing a mold (64) comprising a mold cavity (66) with a root end (68) and an opposing tip end (70), arranging one or more preformed sheets (72a, 72b, 72c) in the mold cavity (66), wherein each preformed sheet comprises a mixture of fibre rovings (82) and a binding agent, wherein the fibre rovings are at least partially joined together by means of the binding agent, and injecting the one or more preformed sheets (72a, 72b, 72c) with a resin to mold the shell part. The present invention also relates to a shell part of a wind turbine blade obtainable by said method, to a preformed sheet for use in (Continued)

Figure 1:
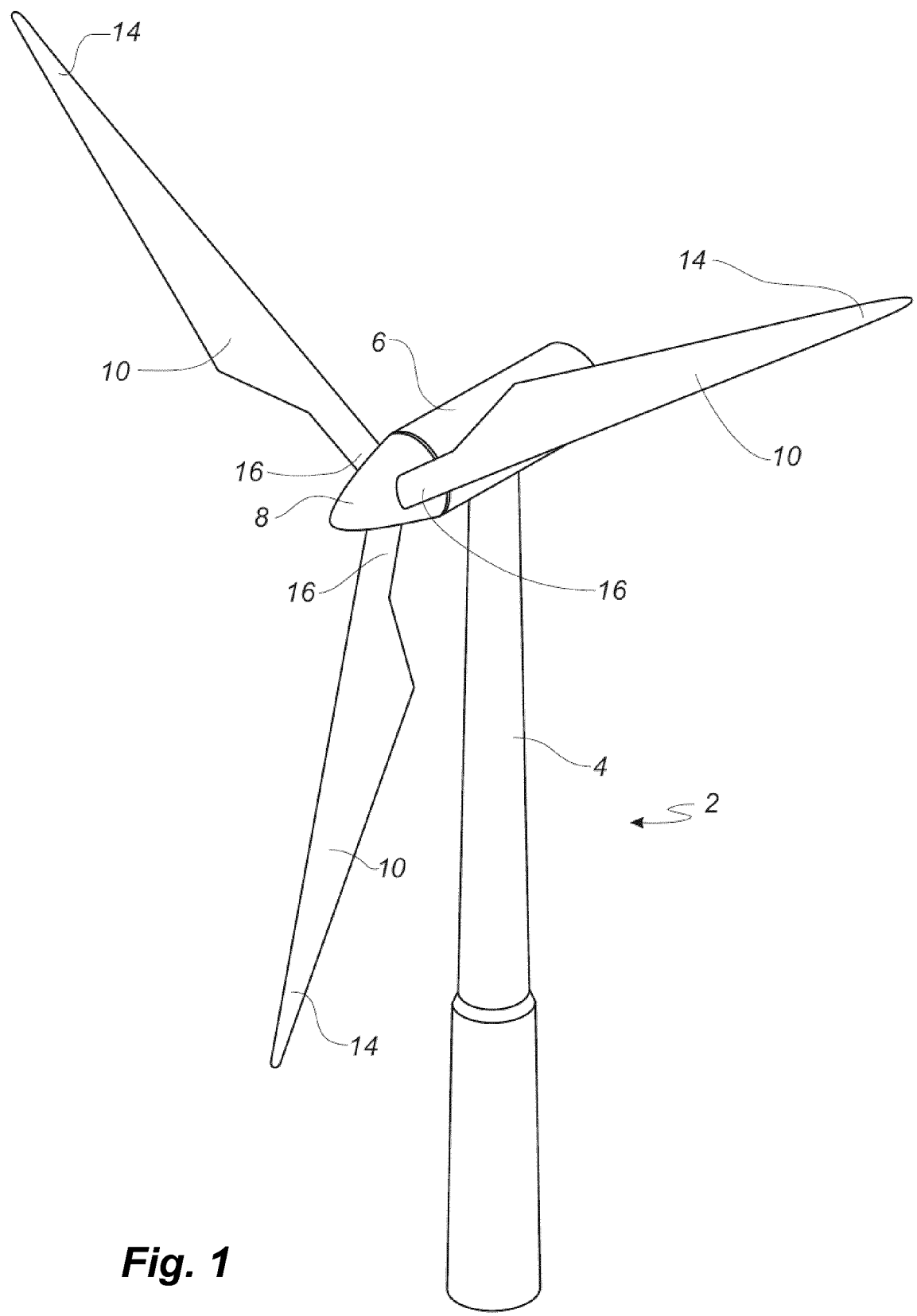

said method and to a method of manufacturing said preformed sheet.

14 Claims, 6 Drawing Sheets

(51) Int. Cl.
  *B29C 70/44* (2006.01)
  *B29C 70/08* (2006.01)
  *B29B 11/04* (2006.01)
  *B29L 31/08* (2006.01)
  *B29D 99/00* (2010.01)
  *B32B 37/16* (2006.01)
  *F03D 1/06* (2006.01)

(52) U.S. Cl.
  CPC ........ *B29C 70/443* (2013.01); *B29D 99/0028* (2013.01); *B29L 2031/085* (2013.01); *B32B 37/16* (2013.01); *F03D 1/0675* (2013.01); *F05B 2230/00* (2013.01); *Y02P 70/50* (2015.11)

(58) Field of Classification Search
  CPC ..... Y02P 70/523; B32B 37/16; F03D 1/0675; F05B 2230/00; B29L 2031/085
  See application file for complete search history.

(56) References Cited

U.S. PATENT DOCUMENTS

| | | | | |
|---|---|---|---|---|
| 2010/0212816 A1* | 8/2010 | Schreckenberg | ....... | B29C 33/52 156/187 |
| 2011/0031758 A1* | 2/2011 | Mitsuoka | ........... | B32B 5/18 290/55 |
| 2011/0044820 A1* | 2/2011 | Stenbaek Nielsen | ........... | B29C 70/547 416/223 R |
| 2011/0171034 A1* | 7/2011 | Whiter | ........... | C08J 5/24 428/221 |
| 2013/0090027 A1* | 4/2013 | Harris | ........... | B29C 63/22 440/71 |
| 2015/0151390 A1* | 6/2015 | Upton | ........... | B29D 99/0028 29/889.7 |
| 2015/0252781 A1 | 9/2015 | Bech | | |
| 2015/0314536 A1* | 11/2015 | Smith | ........... | B29C 31/08 156/222 |

FOREIGN PATENT DOCUMENTS

| EP | 2338688 A1 | 6/2011 | | |
|---|---|---|---|---|
| EP | 2875937 B1 | 3/2021 | | |
| WO | WO-2014191112 A1 * | 12/2014 | ............. | B29B 15/08 |

OTHER PUBLICATIONS

Gantasala Sudhakar et al: "Numerical Investigation of the Aeroelastic Behavior of a Wind Turbine with Iced Blades", Energies, vol. 12, No. 12, Jun. 24, 2019 (Jun. 24, 2019), p. 2422, XP055922859, DOI: 10.3390/en12122422 abstract; figure 4 table A1.

Terekhov Ivan V. et al: "Binders Used for the Manufacturing of Composite Materials by Liquid Composite Molding", Polymers, vol. 14, No. 1, Jan. 1, 2022 (Jan. 1, 2022), p. 87, XP055922865, DOI: 10.3390/polym14010087 Retrieved from the internet: URL: https://www.ncbi.nlm.nih.gov/pmc/articles/PMC8747511/pdf/polymers-14-00087.pdf tables1, 3.

Schúrmann Helmut: "Konstruieren mit Faser-Kunststoff-Verbunden" In: "Konstruieren mit Faser-Kunststoff-Verbunden", Dec. 31, 2007 (Dec. 31, 2007), Springer, XP055923023, ISBN: 978-3-540-72189-5 pp. 190-191, table 8.1.

* cited by examiner

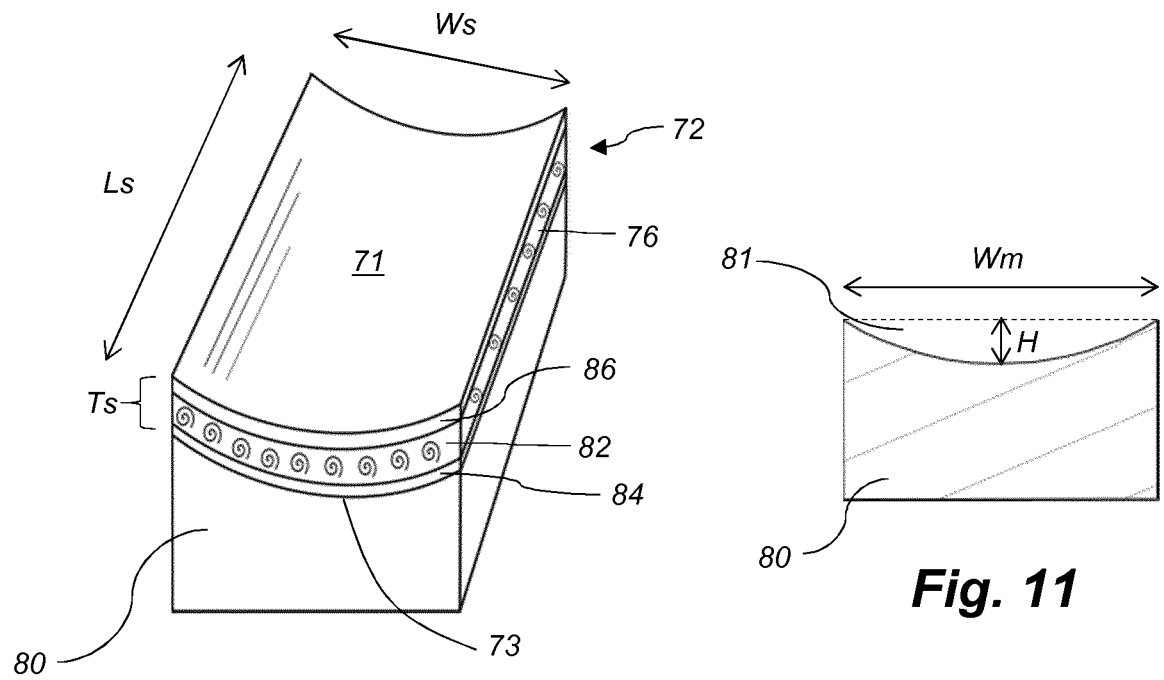
*Fig. 10*
*Fig. 11*
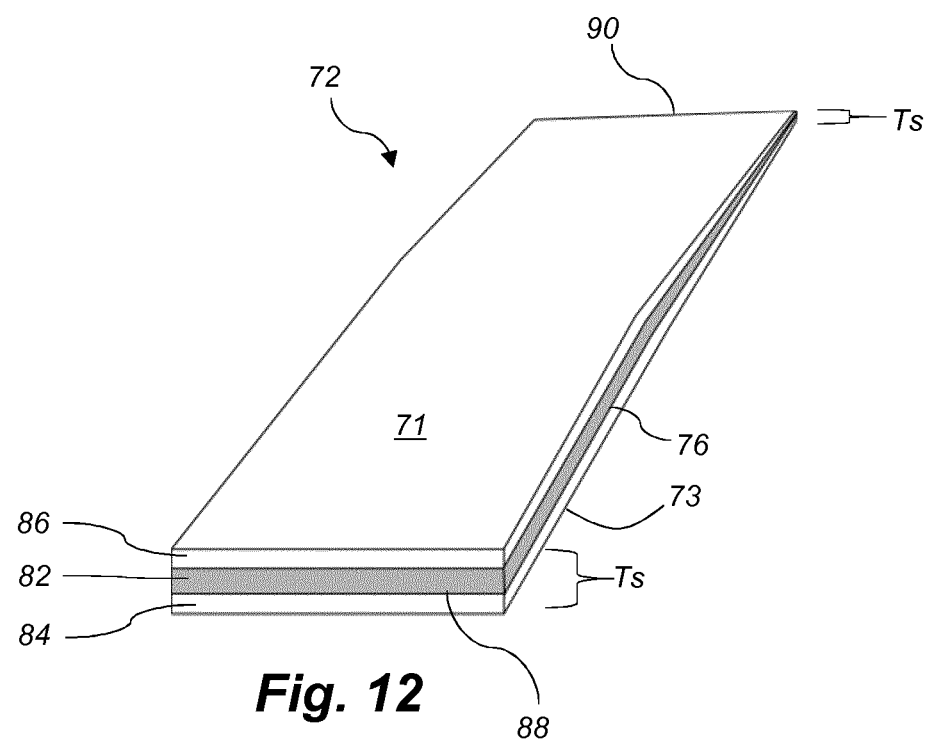
*Fig. 12*

METHOD OF MOLDING A SHELL PART OF A WIND TURBINE BLADE

This is a National Phase Application filed under 35 U.S.C. 371 as a national stage of PCT/EP2016/054426, filed Mar. 3, 2016.

FIELD OF THE INVENTION

The present invention relates to a method of molding a shell part of a wind turbine blade. In other aspects, the present invention relates to a shell part of a wind turbine blade obtainable by said method, to a preformed sheet for use in said method and to a method of manufacturing said preformed sheet.

BACKGROUND OF THE INVENTION

Wind power is becoming increasingly popular due to its clean and environmentally friendly production of energy. The rotor blades of modern wind turbines capture kinetic wind energy by using sophisticated blade design created to maximize efficiency. Turbine blades may today exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between both sides. The resulting lift force generates torque for producing electricity.

The shell halves of wind turbine blades are usually manufactured using molds. First, a blade gel coat or primer is typically applied to the mold. Subsequently, fibre reinforcement and/or fabrics are placed into the mold followed by resin infusion. A vacuum is typically used to draw epoxy resin material into a mold. Alternatively, prepreg technology can be used, in which a fibre or fabric pre-impregnated with resin forms a homogenous material which can be introduced into the mold. Several other molding techniques are known for manufacturing wind turbine blades, including compression molding and resin transfer molding. The shell halves are assembled by being glued or bolted together substantially along a chord plane of the blade. The root region of each shell half typically has a circular cross section.

In vacuum assisted resin transfer molding (VARTM), glass fibre plies are placed in a mold with the correct orientation and subsequently resin is forced to flow through the fibres using a vacuum pump. This is usually followed by a curing cycle at atmospheric pressure.

A typical molding process includes bagging, resin infusion and subsequent curing. Bagging involves placing a vacuum foil on the fibre plies that have been laid up on the tool. The vacuum foil is used to press this part to the tool and to allow a vacuum to be drawn into the void formed by the bag and the tool such that the fibres of the part are infused with resin. Typical vacuum foils may be formed by one or more plastic sheets which are placed to cover the blade. Infusion comprises feeding resin under a vacuum to wet the laid out fibres to form a solid shell part. In subsequent curing, heating and subsequently cooling may be applied to harden the resin.

In particular when manufacturing large blades, the glass fibre layup at the root end becomes critical. Glass fibre material may slide down the almost vertical shell mold walls. The sliding of fibre material during manufacturing may lead to the formation of undesired wrinkles in the shell structure, which may present zones of structural weakness within the blade.

European Patent EP 2617555 B1 discloses a method for manufacturing a wind turbine rotor blade comprising a trailing edge comprising fibre rovings. The method comprises the steps of laying up a number of layers comprising fibre material onto the inner surface of a first mold part, laying up a plurality of fibre rovings onto the number of layers at a position which forms the trailing edge of the blade, and casting the blade using Vacuum Assisted Resin Transfer Molding.

Similarly, US 2012/0261864 A1 discloses a method involving layering of fibre material on a mold surface, includes laying rovings of said fibre material on the mold surface, or on a fibre material already laid on the mold surface, and applying vacuum to a space between the rovings and the mold surface. The rovings are rolled off a reel or laid out of a cassette.

US 2015/0285083 A1 relates to a curved fibre mat including rovings being arranged side by side and being connected to one another in at least two connection areas by stitching. At least one of the rovings is continuous between the at least two connection areas and at least one of the rovings is discontinuous between the at least two connection areas.

Some of the afore-mentioned prior art approaches present challenges in handling the components such as fibre rovings, in particular in the root lay-up, as the slope of the mold for forming the wind turbine shell part can be quite steep. Thus, although fibre rovings may present an economical alternative to woven fibre mats or similar materials, their used is limited by these problems in layup and handling.

It is therefore an object of the present invention to overcome one or more of the above-discussed drawbacks of the known methods.

It is another object of the present invention to provide a method for molding a shell part of a wind turbine blade that is simple and cost-effective.

In particular, it is an object of the present invention to provide a method for molding a shell part of a wind turbine blade that is associated with improved stability and easier handling of the components used in said method.

SUMMARY OF THE INVENTION

In a first aspect, the present invention relates to a method of molding a shell part of a wind turbine blade, the blade having a profiled contour including a pressure side and a suction side, and a leading edge and a trailing edge with a chord having a chord length extending therebetween, the wind turbine blade extending in a spanwise direction between a root end and a tip end, said method comprising:
  providing a mold comprising a mold cavity with a root end and an opposing tip end,
  arranging one or more preformed sheets, such as two or more preformed sheets, in the mold cavity, wherein each preformed sheet comprises a mixture of fibre rovings and a binding agent, wherein the fibre rovings are at least partially joined together by means of the binding agent, and
  injecting the one or more preformed sheets, such as two or more preformed sheets, with a resin to mold the shell part.

By mixing and joining together the fibre rovings with a binding agent, the resulting preformed sheet is both cost-effective and easy to handle in the subsequent shell part molding step. The method of the present invention was found to result in material cost savings of up to 30-45% owing to the simple and efficient use of fibre rovings instead of more costly materials, such as woven fibre mats. It has also been found by the present inventors, that the inventive method results in a reduced tendency of the fibre rovings to produce irregularities in the shell part laminate, since the individual roving will not be able to "stand up" or fold in a vertical direction. The latter is a problem of prior art fibre mats.

Without being bound by theory, it is believed that the binding agent is also beneficial in creating channels for the subsequent resin infusion by providing spacings between the rovings. This facilitates resin infusion of the preformed sheets after the sheets have been arranged in the blade mold.

The preformed sheet of the present invention was found to be sufficiently flexible and able to follow the necessary movements and form adaptions during manufacturing of the blade. In particular, such preformed sheet can be advantageously used for lay-up in parts of the blade molds, which are too steep for some of the afore-mentioned prior art approaches using fibre rovings. Since the fibre rovings are mixed and joined together by the binding agent, the risk of slipping, displacement or other unwanted movement is greatly diminished.

Typically, the shell part molded by the method of the present invention will be a shell half. Usually, the tip end of the mold cavity will correspond to the tip end of the blade to be manufactured. Likewise, the root end of the mold cavity will usually correspond to the root end of the blade.

Preferably, at least two or more preformed sheets are arranged in the mold cavity. In other embodiments, at least three, such as at least four, or at least five preformed sheets are arranged in the mold cavity. The preformed sheets may be arranged side-by-side in the mold cavity. Typically, each preformed sheet has a length, a width and a thickness, as well as two longitudinally extending lateral edges in between a top surface and an opposing bottom surface. Also, each preformed sheet will usually have a front edge and an opposing back edge. The top surface and bottom surface of the sheet may be constituted by a top fibre mat and a bottom fibre mat, respectively.

In a preferred embodiment, the rovings comprise glass fibres or consist of glass fibres. In other embodiments, the rovings may comprise, or consists of, glass fibres, carbon fibres, aramid fibres, basalt fibres, natural fibres or mixtures thereof.

In one embodiment, the rovings are arranged side-by-side within the preformed sheets. In other embodiments, the rovings are arranged unidirectionally within the preformed sheets. Usually, the mixture between fibre rovings and binding agent is such that at least 75%, more preferably at least 90%, most preferably at least 95% of the surface of the fibre rovings is contacted with the binding agent.

The resin for injecting the one or more preformed sheets may be an epoxy, a polyester, a vinyl ester or another suitable thermoplastic or duroplastic material.

In a preferred embodiment, each preformed sheet further comprises at least one fabric, such as a top fibre mat and/or a bottom fibre mat. The fibre rovings may be arranged on top and/or below such fabric.

In a preferred embodiment, the binding agent is present in an amount of 0.1-15 wt % relative to the weight of the fibre rovings. Preferably, the binding agent is present in an amount of 0.5-10 wt %, preferably 0.5-5 wt %, more preferably 0.5-3.5 wt %, relative to the weight of the fibre rovings. The binding agent may also comprise two or more different substances, as long as the total binding agent is present in an amount of 0.1-15 wt % relative to the weight of the fibre rovings.

It was found that the comparatively low amount of binding agent of 0.1-15 wt % relative to the weight of the fibre rovings provides improved flexibility as contrasted to known fibre preforms for manufacturing wind turbine blades. It was also found that this amount of binding agent results in sufficient stability for handling during the blade molding process.

In a preferred embodiment, the binding agent is a thermoplastic binding agent. Typically, the fibre rovings are at least partially joined together by means of the binding agent by thermal bonding. In a preferred embodiment, the binding agent is a binding powder, such as a thermoplastic binding powder.

According to another embodiment, the melting point of the binding agent is between 40° and 220° C., preferably between 40 and 180° C., such as between 40 and 170° C., or between 40 and 160° C.

According to another embodiment, the preformed sheets have an elastic modulus (Young's modulus) of between 0.01 and 250 GPa, preferably 0.01-100 GPa, such as between 0.01-45 GPa or between 0.01-10 GPa. Preformed sheets with such elasticity were found to be particularly well suited for a blade manufacturing process according to the present invention.

According to one embodiment, the binding agent is a thermoplastic binding agent. According to another embodiment, the binding agent comprises a polyester, preferably a bisphenolic polyester. An example of such binding agent is a polyester marketed under the name NEOXIL 940. Examples include NEOXIL 940 PMX, NEOXIL 940 KS 1 and NEOXIL 940 HF 2B, all manufactured by DSM Composite Resins AG. Preferably, the binding agent is a polyester, preferably a bisphenolic polyester. In other embodiments, the binding agent is a hotmelt adhesive or based on a prepreg resin.

In one embodiment, the preformed sheets are arranged in the mold cavity such that the longitudinal axes of the preformed sheets are aligned substantially parallel to each other.

According to another embodiment, the preformed sheets are arranged in the mold cavity such that a longitudinally extending lateral edge of at least one preformed sheet abuts a longitudinally extending lateral edge of an adjacent preformed sheet. The indivdual sheets will then usually be connected to the adjacent sheets by the resin infusion step. If more than two preformed sheets are arranged in this embodiment, for some sheets, both lateral edges will abut respective lateral edges of adjacent sheets on either side.

Alternatively, the preformed sheets may be arranged in the mold cavity such that a longitudinally extending lateral edge of at least one preformed sheet overlaps with an adjacent preformed sheet. Again, the indivdual sheets will then usually be connected to the adjacent overlapping sheets by the resin infusion step.

According to another embodiment, each preformed sheet has a length, width and thickness, wherein its length-width ratio is at least 5:1. In some embodiments, the length-width ratio is at least 8:1, such as at least 10:1 or at least 15:1, such as at least 100:1 or at least 200:1.

According to another embodiment, each of the preformed sheets further comprises a top fibre mat and a bottom fibre mat in between which the fibre rovings are arranged. For the fibre mats, a woven mat of fibre material may be used.

In one embodiment, the one or more preformed sheets are placed onto a fibre material, a blade gel coat and/or a primer, already laid on the surface of the mold cavity.

According to another embodiment, the method further comprises a step of laying up a vacuum foil onto the preformed sheets as the topmost layer prior to resin injection. Preferably, the blade part is molded using Vacuum Assisted Resin Transfer Molding.

Typically, the mold cavity comprises a substantially semicircular cross section at its root end. The preformed sheets will usually be arranged such in the mold cavity that they extend from the root end towards the tip end of the mold cavity.

According to another embodiment, the length of each preformed sheet is at least 15 m, preferably at least 20 m, such as at least 25 m, or at least 35 m. In another embodiment, the length of a preformed sheet extends along the full length of the blade part.

In a preferred embodiment, the thickness of at least one preformed sheet decreases from its front edge to its back edge as seen in its longitudinal direction. Such a tapered shape is advantageous in that it provides a gradual transition between a relatively high wall thickness in the root region and a usually lower wall thickness in the transition region and the airfoil region of the blade.

According to another embodiment, the preformed sheets are arranged in the mold cavity such that the angle between the horizontal plane and a line that is tangential to the vertex of a curved bottom surface of a preformed sheet is different for each preformed sheet.

According to another embodiment, at least one preformed sheet is arranged in the mold cavity such that the angle between the horizontal plane and a line that is tangential to the vertex of a curved bottom surface of said preformed sheet is more than 45°, preferably more than 60°, such as more than 75°. Thus, the preformed sheet of the present invention is advantageous in that it can be laid along a curved path or a steep mold cavity surface without producing wrinkles or creases, and without any significant sliding of the fibre rovings in the mold.

According to another embodiment, the preformed sheets are arranged in the mold cavity in a region between the root end of the mold cavity and the position of maximum chord length, as seen in the longitudinal direction of the mold cavity.

In another aspect, the present invention relates to a shell part of a wind turbine blade obtainable by the method of the present invention.

In yet another aspect, the present invention relates to a preformed sheet for use in a method according to the present invention, the preformed sheet comprising a mixture of fibre rovings and a binding agent, wherein the fibre rovings are at least partially joined together by means of the binding agent, and wherein the binding agent is present in an amount of 0.1-15 wt % relative to the weight of the fibre rovings.

The different embodiments and features of the preformed sheet, as described above in the context of the method of molding a shell part, equally apply to the preformed sheet as such and may be combined accordingly. In particular, the thickness of the preformed sheet of the present invention may decrease from a front edge to a back edge as seen in its longitudinal direction.

Typically, the preformed sheets have an at least partly curved top surface and/or an at least partly curved bottom surface. When laying the preformed sheet into a curved mold cavity, the bottom surface of the preformed sheet may advantageously adapt the form of the curved mold cavity surface. In other embodiments, the preformed sheets have a planar top surface and/or a planar bottom surface.

In another aspect, the present invention relates to a method of manufacturing a preformed sheet according to any of the preceding claims comprising the steps of contacting fibre rovings with a binding agent, and subsequently heating the fibre rovings and the binding agent for forming the preformed sheet.

The step of contacting the fibre rovings with a binding agent may be accomplished by using a bath containing the binding agent and pulling the fibre rovings through the bath. Subsequently the fibre rovings and binding agent can be laid up in the preform mold, for example after having been pulled through a nozzle or the like, for ensuring unidirectional orientation of the fibre rovings. Alternatively, the step of contacting the fibre rovings with a binding agent may be accomplished during the roving manufacturing process, such as during sizing.

In one embodiment, the mixture of the fibre rovings and the binding agent is laid in a preform mold, followed by heating the laid up fibre rovings and binding agent for forming the preformed sheet. Advantageously, the preform molds do not need to be vacuum tight, which is beneficial in terms of cost reduction. Also, typically no extreme precision is required for manufacturing the preformed sheets (cm range rather than mm range). In some embodiments, the fibre rovings are laid on a bottom fibre mat and subsequently covered by a top fibre mat. Thus, the fibre rovings are sandwiched between two fibre mats. For the fibre mats, a woven mat of fibre material may be used.

The fibre rovings can advantageously be laid back and forth around a pin or similar device. In one embodiment, the rovings are arranged side by side in the preform mold.

Preferably, the mold cavity of the preform mold is substantially horizontal, i.e. only minimally curved. In one embodiment, the preform mold has a curved mold cavity, wherein the ratio of the width (Wm) and the maximum height (H) of the curved mold cavity is 10:1 or more, such as 15:1 or more, or 20:1 or more. Such a mold of minimal curvature may advantageously allow for the lay-up of fibre rovings, which would be more challenging in a more curved, steeper mold cavity. Thus, the resulting shell part may include a higher amount of fibre rovings, replacing some of the previously needed fibre mats. The same approach would not be feasible directly in the blade mold because of the steep slopes of its mold cavity, in particular at the circular root end thereof.

As used herein, the term "sheet" denotes a laminar element having a width and length substantially greater than the thickness thereof.

As used herein, the term "horizontal" refers to an orientation parallel to the ground upon which the mold that used in the method of the present invention is placed.

The term "substantially parallel", as used herein, refers to the respective longitudinal axes of two adjacent preformed sheets not intersecting at an angle greater than 20°, preferably not greater than 10°, most preferred not greater than 5°.

As used herein, the term "wt %" means weight percent. The term "relative to the weight of the fibre rovings" means a percentage that is calculated by dividing the weight of an agent, such as a binding agent, by the weight of the fibre rovings. As an example, a value of 1 wt % relative to the weight of the fibre rovings corresponds to 10 g of binding agent per kilogram of fibre rovings.

The skilled reader will understand that the elastic modulus, also known as Young's modulus, defines the relationship between stress (force per unit area) and strain (proportional deformation) in a material. Thus, the elastic modulus is a measure of the stiffness of a material. The elastic modulus can be determined by the cantilever beam test, as is well known in the art.

DETAILED DESCRIPTION OF THE INVENTION

Figure 2:
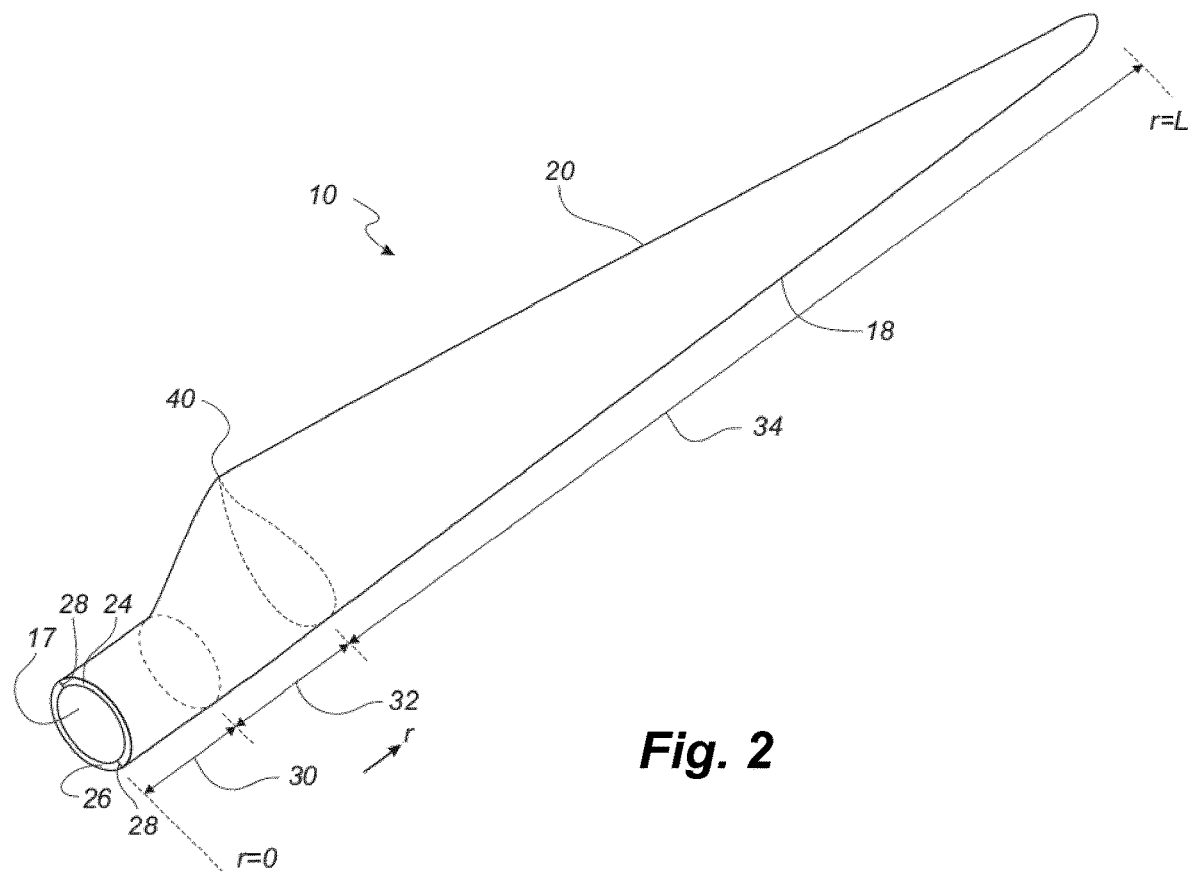
Figure 3:
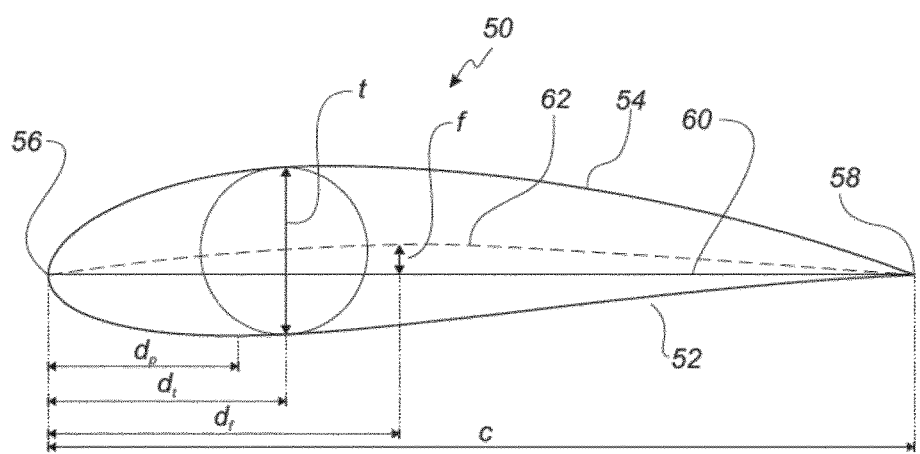
Figure 4:
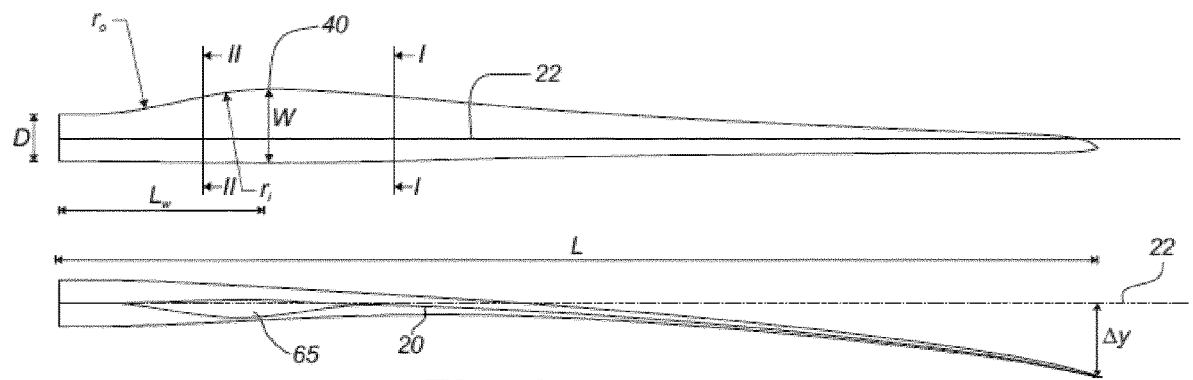
Figure 5:
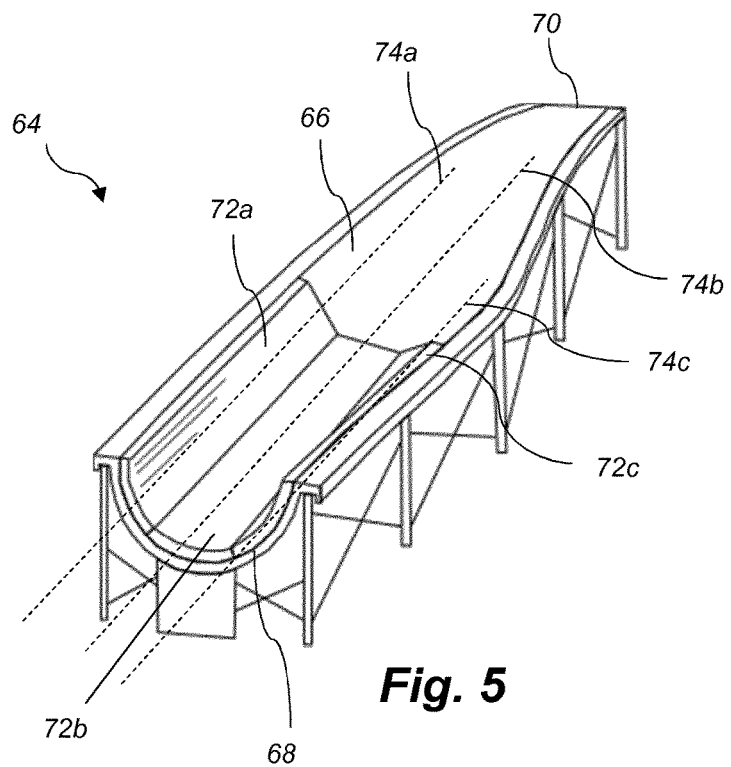
Figure 6:
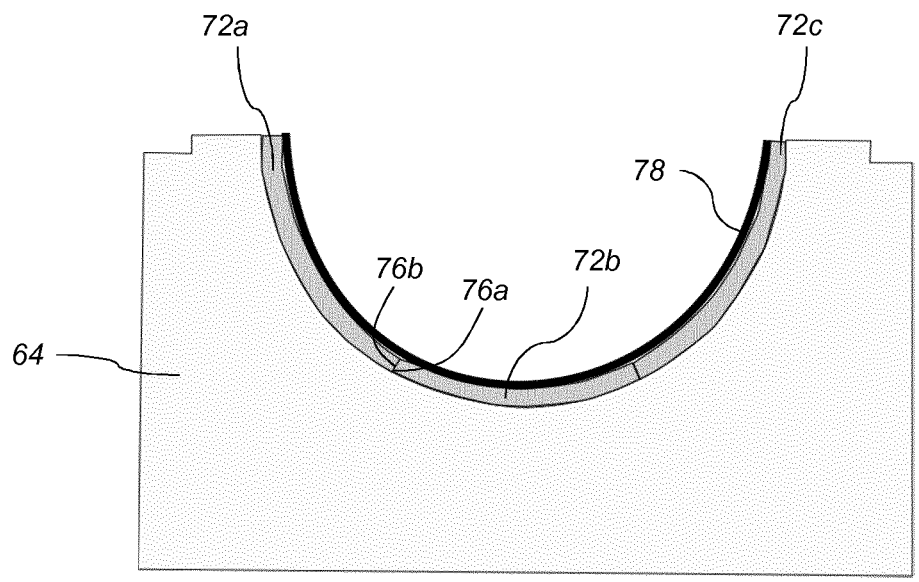
Figure 7:
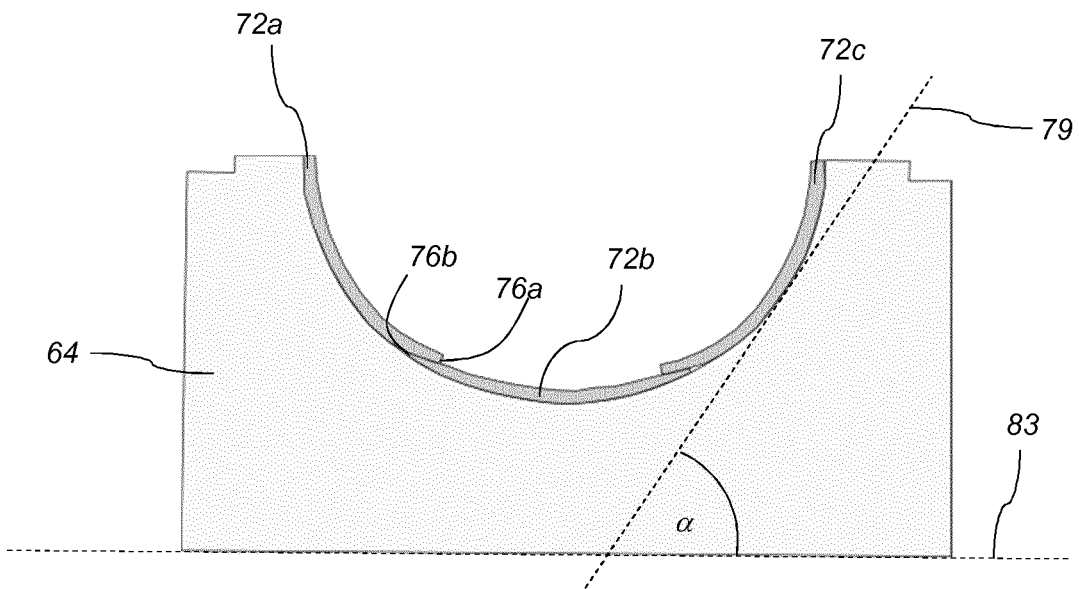
Figure 8:
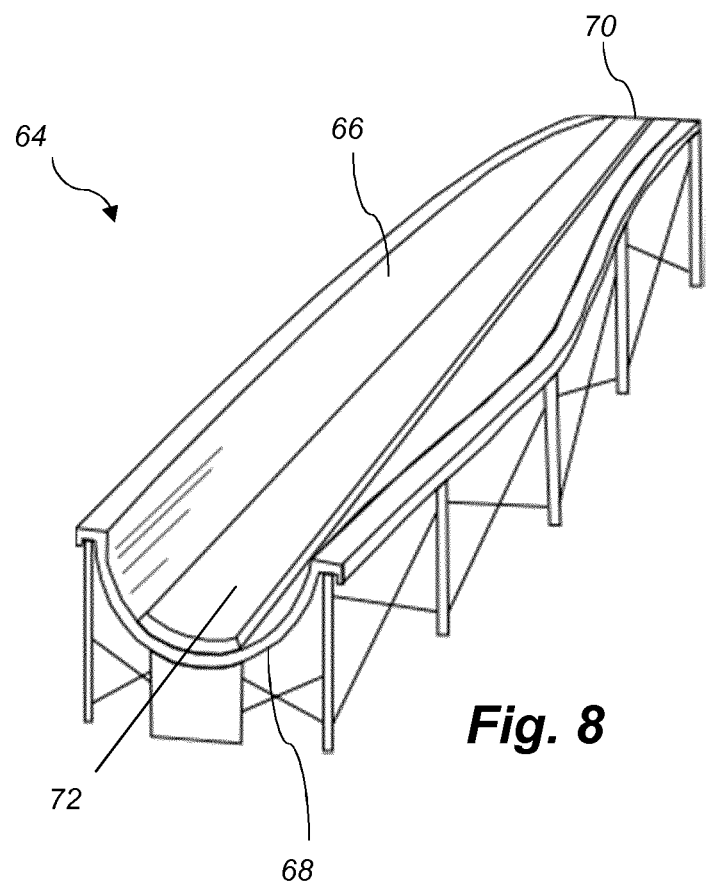
Figure 9:
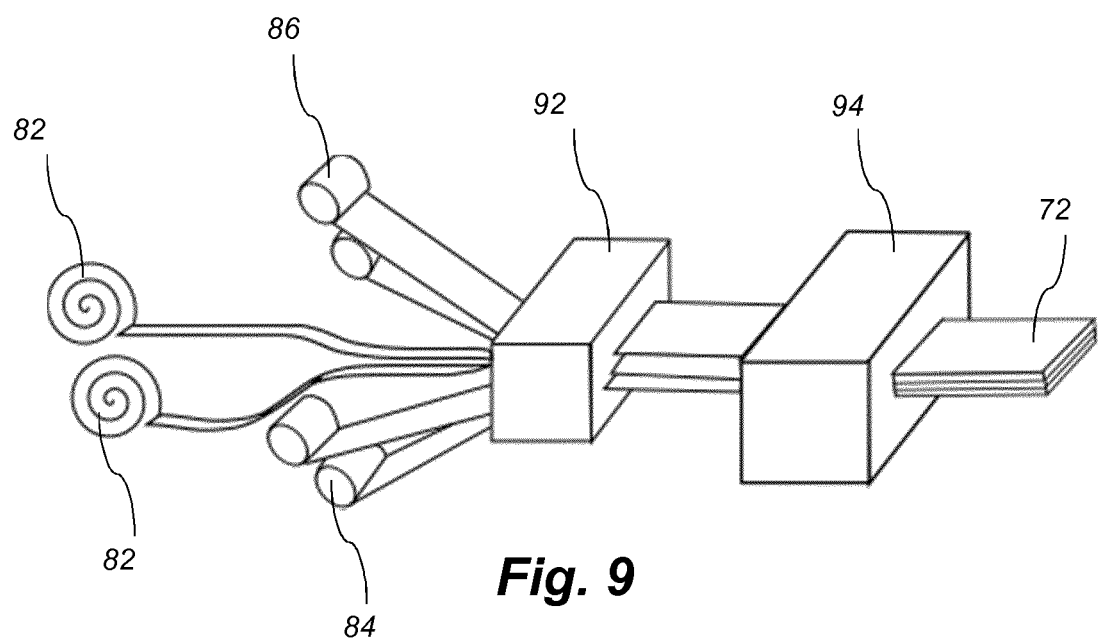

The invention is explained in detail below with reference to embodiments shown in the drawings, in which FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 is a perspective drawing of a mold for manufacturing a shell part of a wind turbine blade using the method of the present invention, FIG. 6 is a front view of a mold for manufacturing a shell part of a wind turbine blade using one embodiment of the present invention, FIG. 7 is a front view of a mold for manufacturing a shell part of a wind turbine blade using another embodiment of the present invention, FIG. 8 is a perspective drawing of a mold for manufacturing a shell part of a wind turbine blade using another embodiment of the method of the present invention, FIG. 9 is a schematic drawing of a method for manufacturing the preformed sheet of the present invention, FIG. 10 is a perspective drawing of a mold for manufacturing the preformed sheet of the present invention, FIG. 11 is a cross-sectional view of the mold of FIG. 8, and FIG. 12 is a perspective view of one embodiment of a preformed sheet according to the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f.

The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

FIG. 5 illustrates a mold 64 comprising a mold cavity 66 for molding a shell part of a wind turbine blade. The mold cavity has a root end 68 and an opposing tip end 70 corresponding to the respective root and tip ends of the blade to be manufactured. In the embodiment shown in FIG. 5, three preformed sheets 72a, 72b, 72c are arranged in the mold cavity 66 for subsequent infusion with a resin to mold the shell part, e.g. by Vacuum Assisted Resin Transfer Molding. The respective longitudinal axes 74a, 74b, 74c of the preformed sheets 72a, 72b, 72c are arranged such that they are aligned substantially parallel to each other. A different embodiment of the method is illustrated in FIG. 8. Here, only one preformed sheet 72 is arranged in the mold cavity 66, acting as a main laminate extending along substantially the entire blade length.

As best seen in the root end front view of FIG. 6, the preformed sheets 72a, 72b, 72c are arranged such that a longitudinally extending lateral edge 76a of each preformed sheet abuts a longitudinally extending lateral edge 76b of an adjacent preformed sheet (as exemplified for sheets 72a and 72b). The sheets 72a, 72b, 72c are then joined together in the subsequent resin infusion step, optionally after laying a vacuum foil 78 as the topmost layer.

In an alternative embodiment shown in the root end front view of FIG. 7, the preformed sheets 72a, 72b, 72c are arranged such in the mold 64 that a longitudinally extending lateral edge 76a, 76b of each preformed sheet 72a, 72b, 72c overlaps with an adjacent preformed sheet. Again, the sheets 72a, 72b, 72c are subsequently joined together in by resin infusion and curing (vacuum foil not shown). FIG. 7 also shows that at least the preformed sheet 74c is arranged in the mold cavity such that the angle α between the horizontal plane 83 and a line 79 that is tangential to the vertex of a curved surface of the sheet exceeds 45°.

FIG. 9 illustrates a possible manufacturing method for a preformed sheet 72 of the present invention, in particular one that can be used as main laminate. Herein, the fibre rovings 82 and binding agent are sandwiched between a number of fabrics, or top and bottom mats 84, 86, heated in a heating station 92, and subsequently laminated in a lamination station 94 to produce the preformed sheet 72.

FIG. 10 shows a schematic drawing of another embodiment of a preformed sheet 72 as molded in a substantially horizontally oriented preform mold 80. The sheet 72 has a length Ls, a thickness Ts, and a width Ws. It is formed by sandwiching a plurality of fibre rovings 82 in between a bottom fibre mat 84 and a top fibre mat 86. This could be done by laying a mixture of fibre rovings 82 and a thermoplastic binding agent on top of the bottom fibre mat 84, covering the rovings 82 with the top fibre mat 86, followed by heating to form the preformed sheet. As best seen in FIGS. 8 and 10, the preformed sheet 72 has a longitudinally extending lateral edge 76 extending in between a top surface 71 and a bottom surface 73 of the sheet 72.

The cross-sectional view of FIG. 11 shows some dimensions of the preform mold 80. It has a curved mold cavity 80 with a width Wm and a maximum height H, wherein the width Wm and maximum height H have a ratio of 10:1 or more.

FIG. 12 shows another embodiment of a preformed sheet 72 according to the present invention. Here, the thickness of the preformed sheet 72 decreases from its front edge 88 to its back edge 90 as seen in its longitudinal direction. Typically, the front edge 88 with the higher thickness will be located at the root end of the blade mold cavity when laying the preformed sheets, while the back edge 90 with the lower thickness will be closer to the tip end of the mold cavity.

The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 camber line/median line
64 mold
66 mold cavity
68 root end of mold cavity
70 tip end of mold cavity
71 top surface of preformed sheet
72 preformed sheet
73 bottom surface of preformed sheet
74 longitudinal axis of sheet
76 lateral edge of sheet
78 vacuum foil
79 tangent to vertex
80 preform mold
81 mold cavity of preform mold
82 fibre rovings
83 horizontal plane
84 bottom fibre mat
86 top fibre mat
88 front edge of sheet
90 back edge of sheet
92 heating station
94 lamination station
c chord length
$d_t$ position of maximum thickness
$d_f$ position of maximum camber
$d_p$ position of maximum pressure side camber
f camber
L blade length
r local radius, radial distance from blade root
t thickness
Δy prebend
Ls length of sheet
Ws width of sheet
Ts thickness of sheet
H height of preform mold cavity
Wm width of preform mold cavity

The invention claimed is:

1. A method of molding a shell part of a wind turbine blade, the wind turbine blade (10) having a profiled contour including a pressure side and a suction side, and a leading edge (18) and a trailing edge (20) with a chord having a chord length extending therebetween, the wind turbine blade (10) extending in a spanwise direction between a root end (16) and a tip end (14), wherein the shell part comprises a shell half, said method comprising:
   providing a mold (64) comprising a mold cavity (66) with a root end (68) and an opposing tip end (70), said mold cavity (66) having a semicircular cross-section at the root end (68);
   arranging a plurality of preformed sheets (72a, 72b, 72c) in the mold cavity (66), the plurality of preformed sheets (72a, 72b, 72c) each extending in the mold cavity (66) from the root end (68) towards the opposing tip end (70), wherein each of the preformed sheets comprises a mixture of fibre rovings (82) and a binding agent, wherein the fibre rovings are at least partially joined together by the binding agent, wherein the plurality of preformed sheets (72a, 72b, 72c) are arranged in the mold cavity (66) such that a longitudinally extending lateral edge (76a) of each of the preformed sheets (72a) abuts a longitudinally extending lateral edge (76b) of an adjacent one of the preformed sheets, or such that the longitudinally extending lateral edge (76a) of each of the preformed sheets overlaps an adjacent one of the preformed sheets (72b), each of the preformed sheets having a length (Ls) of at least 15 m, wherein the plurality of preformed sheets comprises at least three of the preformed sheets, and wherein each of the preformed sheets is positioned circumferentially adjacent and contiguous with respect to the adjacent ones of the plurality of preformed sheets; and
   injecting the plurality of preformed sheets (72a, 72b, 72c) with a resin to mold the shell part of the wind turbine blade.

2. The method according to claim 1, wherein at least two or more of the preformed sheets (72a, 72b, 72c) are arranged in the mold cavity (66).

3. The method according to claim 1, wherein each of the preformed sheets further comprises at least one fabric.

4. The method according to claim 1, wherein the binding agent is present in an amount of 0.1-15 wt % relative to the weight of the fibre rovings.

5. The method according to claim 1, wherein the melting point of the binding agent is between 40° C. and 220° C.

6. The method according to claim 1, wherein the preformed sheets have an elastic modulus (Young's modulus) of between 0.01 GPa and 100 GPa.

7. The method according to claim 1, wherein the binding agent comprises a polyester.

8. The method according to claim 1, wherein each of the preformed sheets has a width (Ws) and thickness (Ts), wherein a length-width ratio of each of the preformed sheets is at least 5:1.

9. The method according to claim 1, wherein each of the preformed sheets further comprises a top fibre mat (86) and a bottom fibre mat (84) in between which the fibre roving s are arranged.

10. The method according to claim 1, wherein the length (Ls) of each of the preformed sheets is at least 20 m.

11. The method according to claim 1, wherein a thickness (Ts) of at least one of the preformed sheets (72) decreases from a front edge (88) thereof to a back edge (90) thereof along a longitudinal direction (74a).

12. The method according to claim 1, wherein the preformed sheets (72a, 72b, 72c) are arranged in the mold cavity such that an angle ($\alpha$) between a horizontal plane and a line that is tangential to a vertex of a curved bottom surface (73) of each of the preformed sheets (72) is different for each of the preformed sheets.

13. The method according to claim 4, wherein the binding agent is present in an amount of 0.5-5 wt % relative to the weight of the fibre rovings.

14. The method according to claim 5, wherein the melting point of the binding agent is between between 40° C. and 160° C.

* * * * *